Dec. 10, 1940.  H. HOLDEN  2,224,433
AIR CURRENT DEFLECTOR
Filed Aug. 12, 1939  2 Sheets-Sheet 1

INVENTOR.
HARRY HOLDEN
BY U. S. Charles
ATTORNEY.

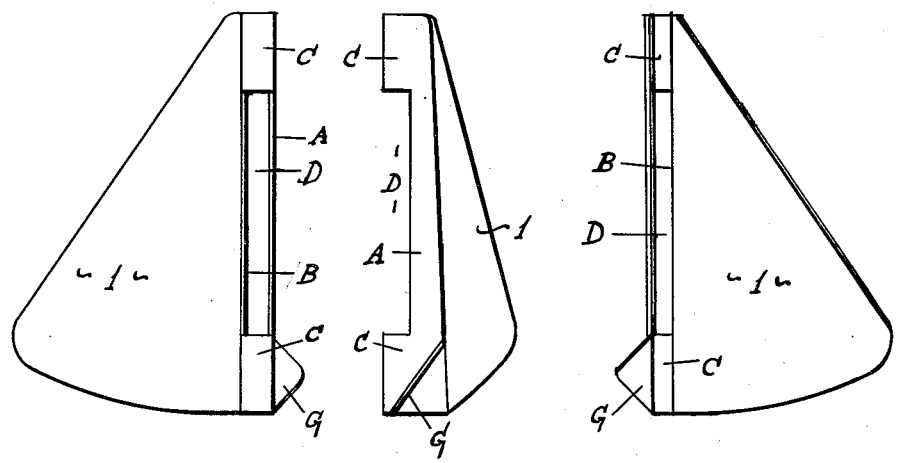
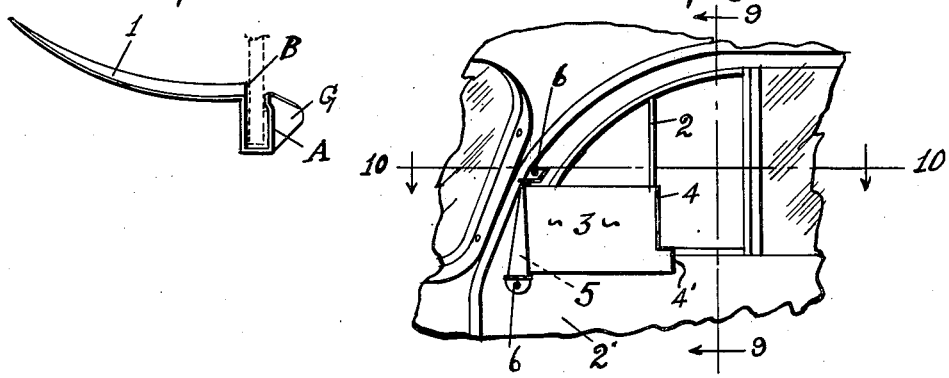
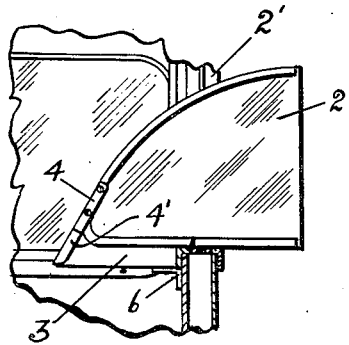
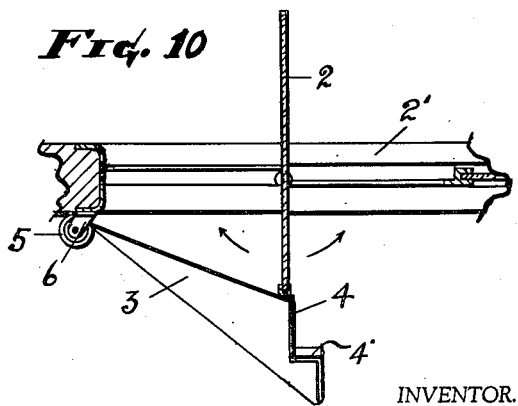

Patented Dec. 10, 1940

2,224,433

UNITED STATES PATENT OFFICE 2,224,433

AIR CURRENT DEFLECTOR

Harry Holden, Wichita, Kans.

Application August 12, 1939, Serial No. 289,847

2 Claims. (Cl. 296—44)

My invention relates to an air current deflector, and has for its principal object a means by which a current of air is directed toward the floor of a motor vehicle body created by the movement of the vehicle or by natural current of the air.

A further object of my invention is to create a circulation of air within the vehicle body in such a way as to avoid direct force of air current at the head of the driver or others seated in the vehicle.

A still further object of my invention is to provide a deflector carried by the pivotally mounted vent sash as controlling means for the air current directed thereby into the vehicle body.

A still further object of my invention is to provide an element as a deflector for air current as it enters the body of a vehicle, through the medium of a predetermined position of the vent sash, the element detachably carried by said vent sash, said deflecting element being inexpensive to construct and efficient in its performance and furthermore being constructed of a single piece of sheet-like material, and easily installed.

These and other objects will hereinafter be more fully explained, reference being had to the accompanying drawings forming a part of this specification, in which like characters will apply to like parts in the different views.

Referring to the drawings:

Fig. 4 is an elevation of the convex side of the deflector.

Fig. 5 is an edge view of Fig. 4 at its connecting edge.

Fig. 6 is a side elevation of the concave side of the deflector.

Fig. 7 is an end view of Fig. 4, looking downward.

Fig. 8 is an inside view of the vehicle body showing the deflector modified.

Fig. 9 is an elevation taken on line 9—9 in Fig. 8.

Fig. 10 is an enlarged plan view taken on line 10—10 in Fig. 8.

Figure 1:
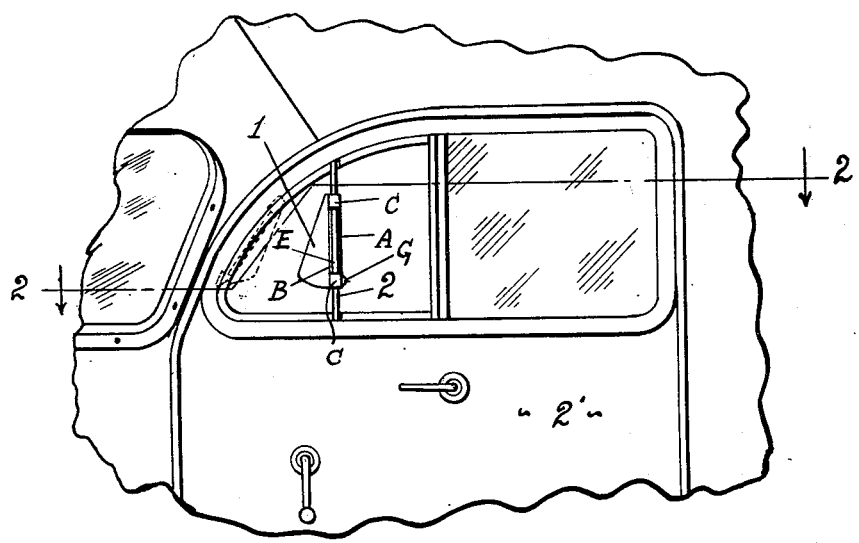
Fig. 1 is an inside view of the vent sash with deflector attached, parts removed for convenience of illustration.
Figure 2:
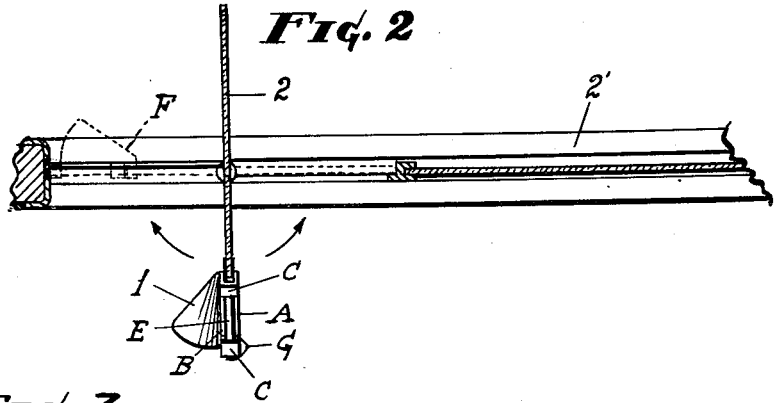
Fig. 2 is an enlarged view taken on line 2—2 in Fig. 1.
Figure 3:
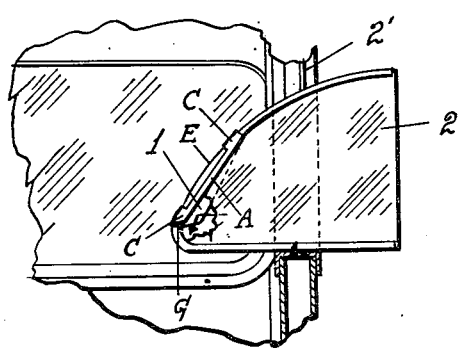
Fig. 3 is a rear view of the vent sash in its open position, parts removed for convenience of illustrating the deflector.

My invention herein disclosed relates to an air current deflecting element, said deflector comprising an arcuate portion 1 with respect to cross section, in other words, the deflector conforms to a peripheral segment of a frusto-conical form; consequently, the edged portions thereof diverge downward with respect to its position as carried by the ventilating sash 2 of a vehicle door 2' as shown in Figs. 1, 2 and 3. One edge of the arcuate portion has a channel integrally joined, said channel comprising legs A and B, that are joined by a web C, an intermediate portion of which as at D is open, through which the forward arced edge portion E of the said vent sash extends, the deflector being so positioned and carried will slant from a vertical plane so that its concavity will deflect a current of air from the vent sash downward when rocked inward to a position similar to that shown in Figs. 2 and 3. Being so arranged, will avoid direct blast of the current of air from the vent sash crossing the vehicle along a horizontal plane therefrom, which is a relief to the driver and occupants of the vehicle in its speed.

It will be seen that the simplicity of applying and removing the deflector is through the medium of channel legs frictionally retaining the structure to the forward end of the vent sash and furthermore the position along the edge of the sash is optional, varying from the lower extremity of said sash and upward therealong, and the arced portion of the sash is free to pass through the opening of the channel whereby an inward position of the deflector upon the sash is means to permit closing thereof as shown by dotted lines F in Fig. 2, in which instance, the arced portion of the deflector extends outward a short distance. This possibility will avoid removing the deflector during weather conditions of high temperature, and may be removed during low temperature if so desired.

As a convenient means to remove the deflector I have turned outward a lower portion G of channel leg A as manipulating element to remove the deflector.

In Figs. 8, 9 and 10 is illustrated a modification of the aforesaid deflector, in which case, I have arranged a flexible element 3 to function for a similar deflection. To one end of said element is secured a bar 4 and means to connect said bar to the forward free end of said ventilating sash, the bar having an offset as at 4' is means to permit normal closing of the sash. The other end of said flexible element is wound on a spring tensioned roller 5 having appropriate brackets 6 of a conventional type, similar to that employed for window shades, the brackets being secured to the frame of said vehicle door, by which means, the flexible deflector is tensioned at all times to avoid a slack condition as the sash is rocked toward its normally closed position.

And such other modifications may be made with respect to the deflector and method of connecting the same to a rockable or sliding sash as may be adopted by varying designs of body construction from time to time without departure from the spirit of this invention, as lie within the scope of the appended claims.

Having fully described my invention what I claim as new and desire to secure by Letters Patent is:

1. An air deflector of the character described for use upon vertically pivoted vehicle ventilators and formed from a single sheet of material, said deflector comprising a body portion of concavo-convex formation and conforming to a frustro-conical segment, one edge of said body portion terminating in an attaching channel of U-shape open upon one side, said channel having its opposite closed side slotted for the reception of the frame member of the ventilator and means integral with said channel for removing the deflector.

2. An air deflector of the character formed from a single sheet of material, said deflector comprising a deflecting body portion concavo-convex in horizontal cross section and generally conforming to a segment of frustro-conical shape, one longitudinal edge of said sector terminating in an open U-shape channel throughout its length, said channel slotted in the base of the U for the major portion of its length, the free edge of said channel having its edge inturned for engaging behind the frame of a vehicle ventilator, the lowermost corner of said channel bent outward at substantially a 45° angle, as and for the purpose specified.

HARRY HOLDEN.